Aug. 2, 1966  P. G. BARTLETT  3,264,604
TRANSDUCER

Original Filed June 12, 1961

INVENTOR.
PETER G. BARTLETT
BY
Woodard, Weikart, Emhardt & Naughton
Attorneys

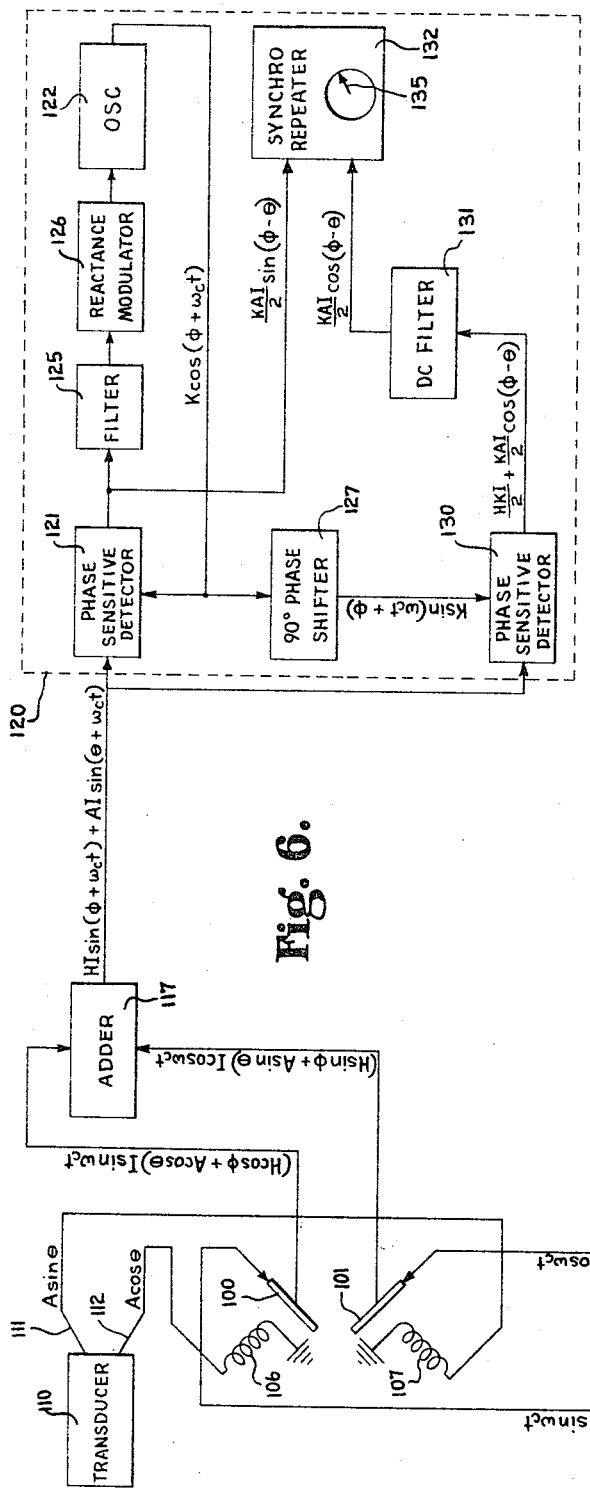

United States Patent Office 3,264,604
Patented August 2, 1966

3,264,604
TRANSDUCER
Peter G. Bartlett, Indianapolis, Ind., assignor to Bartlett Laboratories, Inc., Indianapolis, Ind., a corporation of Indiana
Original application June 12, 1961, Ser. No. 116,603, now Patent No. 3,148,351, dated Sept. 8, 1964. Divided and this application Jan. 20, 1964, Ser. No. 347,325
3 Claims. (Cl. 340—8)

This is a division of application Serial No. 116,603, filed June 12, 1961, now Patent No. 3,148,351.

The present invention relates generally to a resolving system and to one specific embodiment thereof a directional hydrophone system, to a certain subcombination thereof and to a method for reducing the size of a Hall compass which may form a part of the hydrophone system.

It has been found that suspension of a hydrophone within the "sound channel" (normally in the range of 600 to 1,000 feet of depth) results in a great increase in sonar range. One advantage of such an arrangement is the elimination of platform noises such as are present with hull mounted sonars. Such suspended sonar arrangements present an orientation problem. In other words, some efficient means must be provided for indicating the orientation of the sonar transducer before the information therefrom can have any directional meaning.

Consequently, one object of the present invention is to provide a directional hydrophone system capable of measuring the magnetic bearing of a sound.

A further object of the present invention is to provide a resolving system capable of reporting the magnetic bearing of any signal.

Still another object of the present invention is to provide an improved transducer.

A further object of the present invention is to provide a method for reducing the size of a Hall effect compass.

Another object of the invention is to provide a directional hydrophone system which may be lightweight and compact in form.

Still another object of the invention is to provide an improved resolving system.

Related objects and advantages will become apparent as the description proceeds.

The full nature of the invention will be understood from the accompanying drawings and the following description and claims:

FIG. 5 is an exploded perspective view of the Hall effect compass of an alternative embodiment of the directional hydrophone system.

FIG. 6 is an electrical schematic diagram of the alternative embodiment of FIG. 5.

Figure 1:
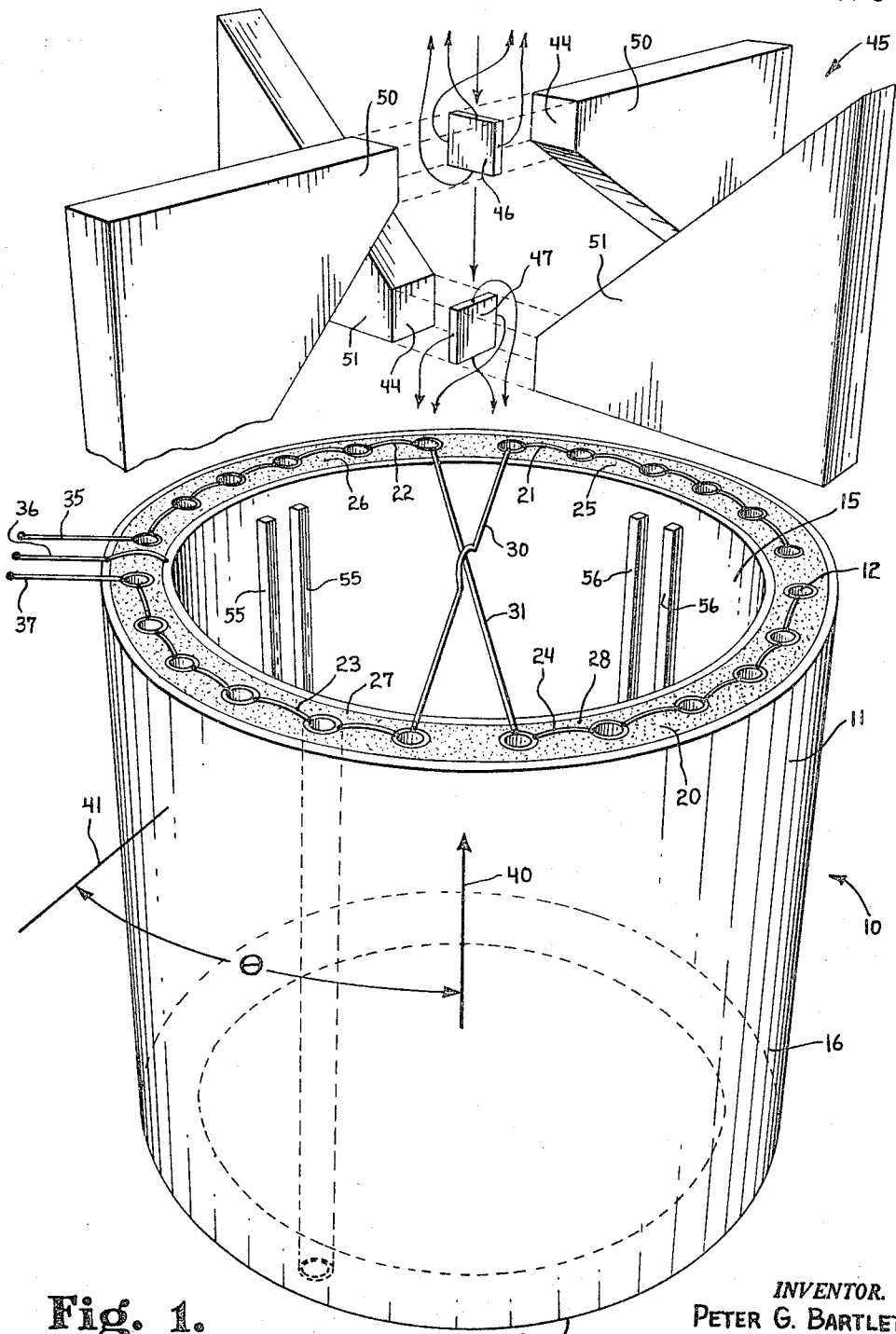
FIG. 1 is an exploded perspective view of a transducer and a Hall effect compass making up a portion of the directional hydrophone system of the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated a transducer 10 comprising a ceramic cylinder 11 formed of electromechanically sensitive dielectric material similar to that used, for example, in pickups for phonographs. Extending axially of the cylinder midway between the inner and outer peripheral surfaces thereof are a series of longitudinal bores or holes 12 which are equally spaced in a circular pattern. The complete inner peripheral surface 15, outer peripheral surface 16 and inside of holes 12 are coated or plated with a conductor such as silver or the like, it being noted, however, that no conductive coating is placed on the ends 20 of the cylinder. The metallized surfaces of the bores 12 are electrically connected in series by wiring 21, 22, 23 and 24 in each of the four quadrants 25, 26, 27 and 28, respectively, of the cylinder. Wiring 21 is series connected to wiring 23 by cross-over wiring 30 and wiring 24 is series connected to wiring 22 by cross-over wiring 31. Output leads 35, 36 and 37 are connected, respectively, to the free end of wiring 22, the metal coatings of the inner and outer surfaces 15 and 16 and the free end of wiring 23.

When the transducer 10 is placed beneath the surface of the water and particularly in the above mentioned "sound channel," it is subjected to sounds which are transmitted through the water and strike the sides of the cylinder 10 causing a repeated bending of the walls thereof in response to the vibrational nature of the sound. It has been found that the bores 12 greatly increase the sensitivity of the transducer resulting in much greater voltages being produced in the wiring 21, 22, 23 or 24 for a given sound to the transducer. Assuming a sound wave moving normally to the axis of the cylinder and toward and against wall of the cylinder, a voltage will be generated which, owing to the above described wiring connections, will be a constant times the sine and cosine of the angle $\theta$ which is measured between the direction of the sound indicated by the arrow 40 and reference line 41 extending through the axis of the transducer and horizontally arranged. In other words, the lead 35 will carry a voltage equal to A sine $\theta$ and the lead 37 will carry a voltage equal to A cosine $\theta$ where A is equal to sin $w_a t$ representing the vibrational nature of the sound. The lead 36 is a common ground from the outer and inner metalized surfaces of the transducer.

It will be understood that some means will be provided for insulating the inner metalized surfaces 15 and 16 from the various wires and from the metallized surfaces of the holes 12. For example, the holes 12 might be filled with a suitable non-conductive liquid such as oil and suitable insulating means fixed to the opposite annular ends of the cylinder 11. The interior of the cylinder 11 should be open as illustrated to allow the water under pressure to pass therethrough thus equalizing the static pressure on the outside and inside of the transducer.

It will be clear that the transducer 11 is of the pressure gradient type. That is, the voltages are generated according to the differences in pressure at the various sides of the transducer. For example, assuming the angle $\theta$ to be zero degrees, the voltage generated in the wire 22 will be cancelled by the voltage generated in the wire 24 and the output of lead 35 will be zero. The voltage generated in the wires 21 and 23 and transmitted to lead 37 will be at a maximum owing to the pressure gradient between the two quadrants 25 and 27.

Figure 4:
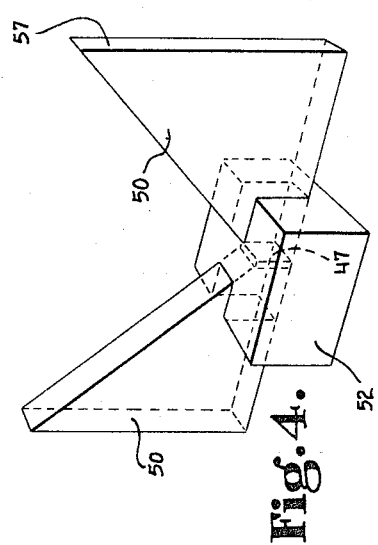
FIG. 4 is a perspective view of a portion of the Hall compass of FIG. 1 showing the manner in which the portion is fixed in assembled relation.

There is also illustrated in FIG. 1 a Hall effect compass indicated generally by the numeral 45 and shown exploded and disassembled from the transducer 10. This compass comprises a pair of Hall generators 46 and 47 and a pair of bow-tie shaped flux concentrators and Hall generators may be potted as illustrated in FIG. 4 within a suitable epoxy 52 having the same coefficient of expansion as the Hall generators in order to fix the parts in assembled relation.

The flux concentrators are then received between suitable ridges 55 and 56 located on the inner peripheral surface 15 of the transducer. The flux concentrators are suitably proportioned in order that they are firmly and not loosely received between these ridges and suitable means is provided for retaining the compass 45 fixedly within the transducer. For example, in the present illustrated form, this means might comprise a frictional relation between each set of flux concentrators and their respective ridges.

Figure 3:
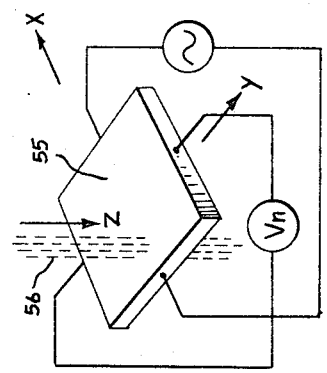
FIG. 3 is a perspective view of a Hall effect wafer with schematic wiring illustrating the Hall effect.

FIG. 3 is a diagrammatic illustration of the Hall effect in a body 55 of semiconductor material. Certain intermetallic semiconductor compounds such as indium arsenide and indium antimonide possess properties necessary to make practical application of the Hall effect possible and are representative of the class of materials used in the Hall generator semiconductor elements of the present invention. A transverse voltage is developed across the semiconductor in the Y direction when it carries current in the X direction and is positioned in a magnetic field 56 in the Z direction. The semiconductor may be positioned so that the earth's magnetic field provides the field 56 and then electron flow in the X direction causes flow in the Y direction as a result of the magnetic field and according to the strength of the magnetic field.

Referring again to FIG. 1, it can be seen that the two Hall effect generators 46 and 47 are mounted at 90° to one another by means of ridges 55 and 56. Feeding of the two generators with individual input carriers separated from one another by 90° in phase will produce an output from each Hall generator which can be used to indicate the angle of orientation of the compass and transducer with respect to magnetic north. This result is achieved by summing the outputs of the two Hall generators to provide a signal whose phase is shifted by an amount equal to the angle of orientation of the Hall compass with respect to magnetic north.

It should be mentioned that the flux concentrators 50 and 51 are composed of material having an extremely high permeability such as, for example, Mumetal or ferrite, whereby the earth's magnetic flux lines are caused to follow a converging path and to be concentrated as they pass through the Hall generators. It has been found that by use of a 10 mil by 20 mil Hall element (measured in the X and Y direction of FIG. 5) and with concentrators having a surface area 57 (FIG. 4) of one square inch and made of Hy-Mu80 iron, amplification was provided of approximately 2,000 times. Thus, the earth's flux which is approximately 0.5 gauss was magnified in one embodiment of the present invention to a desired level of 1,000 gauss.

One feature of the present invention not previously appreciated is that the size of the compass 45 may be reduced to a very small and practical size by reducing the X and Y dimensions (FIG. 3) of the Hall generator. It should be emphasized that it is not necessary to use flux concentrators approaching several feet in length in order to get proper flux magnification in compass 45. Thus, one feature of the present invention is the concept of reducing the size of the flux concentrators by merely reducing the size X-Y area of the Hall effect wafer and then by matching this area with the end area 44 (FIG. 1) of the respective flux concentrators. In other words, the end of the flux concentrator adjacent to the Hall generator is generally equal in area to the Hall generator and the other flux concentrator proportions may be reduced proportionately all of which results in a smaller but just as efficient arrangement.

Figure 2:
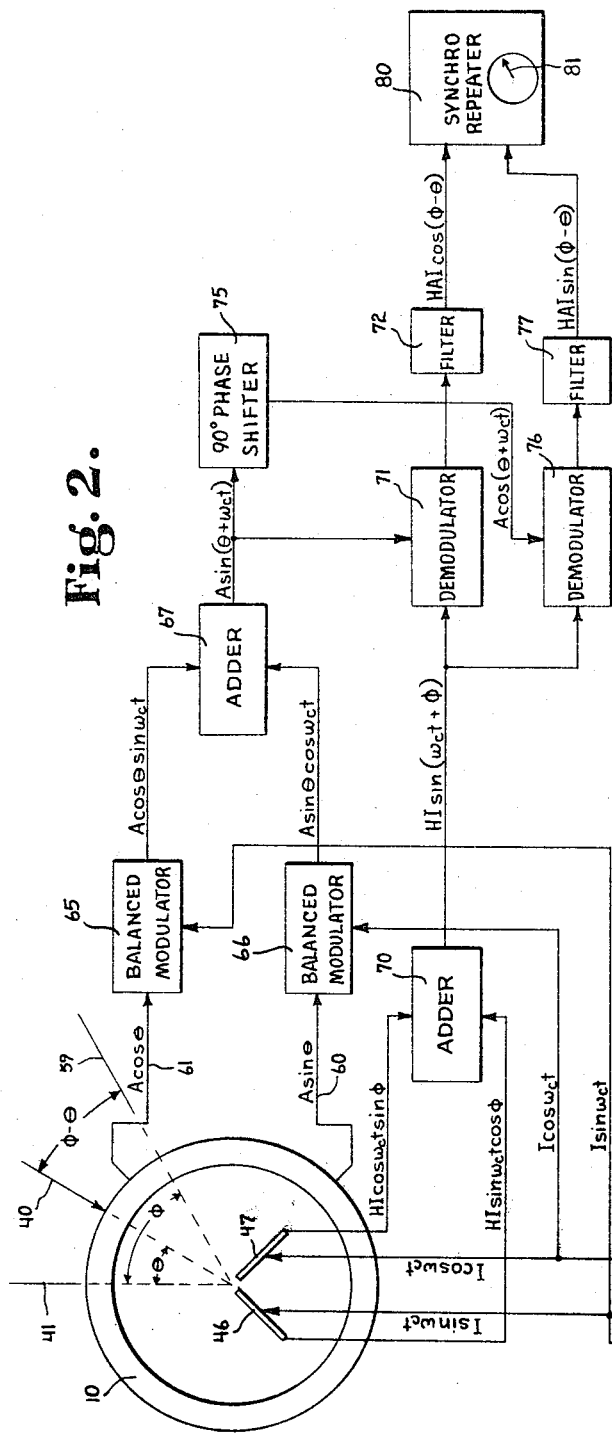
FIG. 2 is an electrical schematic diagram of the directional hydrophone system.

Referring to FIG. 2, the transducer 10 and Hall generators 46 and 47 are illustrated schematically as coupled within a circuit which makes possible direct reading of the angle $\phi-\theta$. As mentioned above the angle $\theta$ is taken between reference 41 and the direction 40 of the incoming sound. The angle $\phi$ is measured between magnetic north 59 and the reference line 41. Thus, the desired answer is $\phi-\theta$ or the angle between the incoming sound and magnetic north. The output from leads 35 and 37 is represented at 60 and 61. These audio frequency outputs are fed into balanced modulators 65 and 66 which receive a superaudio carrier signal from a reference oscillator 62 operating at a fixed frequency. The oscillator 62 is coupled directly to modulator 65 providing a carrier wave $I \sin w_c t$ thereto and is coupled through 90° phase shifter 67 to the modulator 66 thus providing a carrier wave $I \cos w_c t$ thereto. The output of each modulator is, of course, the multiple of its two inputs or for modulator 65 $A \cos \theta \sin w_c t$ and for modulator 66: $A \sin \theta \cos w_c t$ with the carrier waves balanced out. These outputs are fed into an adding circuit 67 the output of which is the sum of the inputs:

$A \cos \theta \sin w_c t + A \sin \theta \cos w_c t$ or (from identity $\sin (X+Y) = \sin X \cos Y + \cos X \sin Y$): $A \sin (\theta + w_c t)$.

The reference oscillator 62 also supplies a superaudio frequency driving E.M.F. to the Hall generators which is in the form $I \sin w_c t$ for generator 46 and $I \cos w_c t$ for generator 47. Owing to the Hall effect and the earth's magnetic field, the output of generator 46 will be $HI \sin w_c t \cos \phi$ where H represents the strength of the magnetic field (note that FIG. 2 is only schematic and that the wafer 46 would be at 90° to the reference 41 as in FIG. 1). Similarly, the output of wafer 47 will be $HI \cos w_c t \sin \phi$. These two outputs are fed into the adding circuit 70 thus producing an output $$HI \sin (w_c t + \phi)$$

because of the identity as above set forth.

The outputs from the two adders 67 and 70 are fed into demodulator 71, the output of which is the multiple of the two inputs: $HAI \sin (\theta + w_c t) \sin (\phi + w_c t)$. From the identity $$\sin X \sin Y = \tfrac{1}{2} \cos (X-Y) - \tfrac{1}{2} \cos (X+Y)$$

is will be evident that the output of the demodulator is $HAI/2 \cos (\phi - \theta) - HAI/2 \cos (2w_c t + \theta + \phi)$. The demodulator is provided with a band stop filter 72 which filters out the $2w_c t$ superaudio frequency component of the output thus providing a final output $$HAI/2 \cos (\phi - \theta)$$

The output of adder 67 is also fed through a 90° phase shifter 75 to a demodulator 76 thus causing the input to the demodulator 76 to be $A \cos (\theta + w_c t)$. The output of adder 70 is also fed to this demodulator where the two inputs are multiplied producing an output $$HAI \sin (w_c t + \phi) \cos (w_c t + \theta)$$

From the identity $$\sin X \cos Y = \tfrac{1}{2} \sin (X+Y) + \tfrac{1}{2} \sin (X-Y)$$

it will be evident that the output of the demodulator is $HAI/2 \sin (2w_c t + \phi + \theta) + HAI/2 \sin (\phi - \theta)$. The demodulator 76 is provided with a band stop filter 77 which filters out the superaudio frequency $2w_c t$ component of the output thus resulting in a final output $$HAI/2 \sin (\phi - \theta)$$

The outputs from each of the filters are fed directly into a synchro repeater from the dial 81 of which may be directly read the angle $\phi - \theta$.

It should be appreciated that the output of filters 72 and 77 could be transmitted to some remote receiver for resolving at the remote location. Alternatively, the output of each adder 67 and 70 might be conducted through insulated wires supporting the transducer and Hall generators to a boat or buoy on the surface of the water. But no matter where the synchro repeater or other resolving means is located, it will be obvious that the present invention provides a system for direct measurement and indication of the angle between the direction of a sound moving toward the transducer and magnetic north.

It is desirable that the size and bulk of the components making up the present system be reduced as much as possible. One arrangement for carrying this out is illustrated in FIGS. 5 and 6 and involves using the Hall generators to also perform the function of the balanced modulators 65 and 66. Referring to FIG. 5, there is illustrated a pair of Hall generators 100 and 101 similar or identical to the Hall generators 46 and 47. The flux of the earth's magnetic field is concentrated and passed through these generators in a manner identical to that above described by means of flux concentrators 102 and 105. The Hall generators and flux concentrators may be potted in a manner as similar to that above described and are fixed within a transducer which also may be identical to the transducer above described. However, unlike the embodiment above described, the output from the transducer is added to the earth's flux input to the Hall wafers by means of inductance windings 106 and 107 about respective ones of the flux concentrators 102 and 105.

Referring to FIG. 6, there is schematically illustrated the resolving system of the present embodiment of the invention. It will be noted that the transducer 110 has outputs 111 and 112 which are equal to $A \sin \theta$ and $A \cos \theta$, respectively, where A represents an audio frequency transferred by the transducer into a voltage. Similarly to the above described embodiment, there is provided an oscillator 115, the output of which is equal to $\sin w_c t$. This output is fed into a 90° phase shifter 116, the output of which is $\cos w_c t$.

One Hall generator 100 receives the output directly from the oscillator 115 while the other Hall generator 101 receives the output displaced 90° in phase by means of the phase shifter. As mentioned, one flux concentrator of each Hall generator is provided with windings 106 and 107 which produces a flux proportional to the voltage in the leads 111 and 112. Thus, the Hall generators are acted upon by a combined flux resulting from the earth's magnetic field and the windings 106 and 107 to produce an output equal to the multiple of the current input times the flux input. In other words, the output from Hall generator 100 is equal to:

$$(H \cos \phi + A \cos \theta) I \sin w_c t$$

and the output of the Hall generator 101 is equal to:

$$(H \sin \phi + A \sin \theta) I \cos w_c t$$

These two outputs are fed into the adder 117 which produces an output equal to:

$HI(\cos \phi \sin w_c t + \sin \phi \cos w_c t)$
$\qquad + AI(\cos \phi \sin w_c t + \sin \theta \cos w_c t)$ From the identity:

$$\sin (X+Y) = \sin X \cos Y + \cos X \sin Y$$

it can be determined that the output from the adder 117 is equal to:

$$HI \sin (\phi + w_c t) + AI \sin (\phi + w_c t)$$

It can be appreciated that this output may be carried upon a single insulated wire which, for example, could be the wire supporting the transducer and compass arrangement. In such an embodiment of the invention, the ground would be, of course, the water within which the hydrophone was operating. The demodulator portion of the present arrangement might be located at the upper end of such a wire and is shown schematically together with the resolver within the dotted lines 120 of FIG. 6.

The demodulator includes a phase sensitive detector 121 which receives the input from the adder and also receives an input from an oscillator 122. As mentioned, the input from the adder is equal to $$HI \sin (\phi + w_c t) + AI \sin (\phi + w_c t)$$

The oscillator is locked in to produce an output equal to $K \cos (\phi + w_c t)$. The phase sensitive detector 121 multiplies these two inputs to produce an output equal to:

$HKI \sin (\phi + w_c t) \cos (\phi + w_c t)$
$\qquad + AKI \sin (\theta + w_c t) \cos (\theta + w_c t)$ The identity:

$$\sin X \cos Y = \frac{1}{2} \sin (X+Y) + \frac{1}{2} \sin (X-Y)$$

may be used upon the two components of the above output to illustrate that the output is as follows:

$HKI/2 \sin (2w_c t + 2\phi) + HKI/2 \sin (\phi - \phi)$
$\qquad + AKI/2 \sin (2w_c t + \theta + 0) + AKI/2 \sin (\phi - \theta)$ It will be appreciated that the high frequency $2w_c t$ components of the above output will be filtered out by the detector so that the final output of the detector may be indicated as:

$$HKI/2 \sin (w_c t + \phi - w_c t - \phi) + AKI/2 \sin (\phi - \theta)$$

This output is fed to a low pass filter 125 which is arranged to filter out the A.C. frequency $AKI/2$ term (A being an audio A.C. frequency) but to pass the D.C. component $HK/2$ term of the above output. Thus, the input to the reactance modulator 126 is merely the D.C. component of the above output or, in other words:

$$HKI/2 \sin (w_c t + \phi - w_c t - \phi)$$

This output is used by the reactance modulator in conventional manner to lock in the oscillator 122 at the desired frequency $w_c t$ but displaced in phase by the angle $\phi$. As, for example, is described on page 361 of Basic Electronics by the Bureau of Naval Personnel Navpers 10087, published by the U.S. Government Printing Office, the reactance modulator-oscillator combination might comprise an electron tube operated so that its reactance varies with the modulation signal and thereby varies the frequency of the oscillator.

It will be noted that the sin of $\phi - \phi$ is equal to zero and that when the oscillator is properly locked in, the output of the filter 125 will be equal to zero. Of course, if the frequency of the oscillator 122 varies from the proper $w_c t + \phi$, then the output of the phase sensitive detector will no longer be zero $$[\sin (w_c t + \phi - w_c t - \phi) = \text{zero}]$$

and will change in such a manner that there will be a positive D.C. voltage input (or very low frequency A.C. input) to the reactance modulator 126 which will return the oscillator 122 to its proper frequency and phase output.

The output of the oscillator 122 is also fed through a 90° phase shifter 127 producing an output $K \sin (w_c t + \phi)$ which is fed into a phase sensitive detector 130. The output from the adder 117 is also fed into the phase sensitive detector 130 whereby the two inputs to the detector are multiplied producing an output equal to:

$HKI \sin (\phi + w_c t) \sin (\phi + w_c t) + KAI \sin$
$\qquad (w_c t + \phi) \sin (\phi + w_c t)$ From the identity:

$$\sin X \sin Y = \frac{1}{2} \cos (X-Y) - \frac{1}{2} \cos (X+Y)$$

it can be determined that the output of the detector 130 is equal to:

$HKI/2 \cos (\phi - \phi) - HKI/2 \cos (2w_c t + 2\phi)$
$\qquad + KAI/2 \cos (\phi - \theta) - KAI/2 \cos (2w_c t + \phi + \theta)$ It can be appreciated that the detector 130 will filter ut the superaudio frequency components of the above output thus resulting in an output equal to:

$$HKI/2 \cos (\text{zero}) + KAI/2 \cos (\phi-\theta)$$

This $HKI/2$ term is a D.C. component that is filtered out by the filter 131 prior to feeding the audio frequency output into the synchro repeater 132. Thus, the inputs to the synchro repeater are $KAI/2 \sin (\phi-\theta)$ and $KAI/2 \cos (\phi-\theta)$. The angle $\phi-\theta$ may then be read directly from the dial 135 of the synchro repeater.

It will be obvious from the above description that the present invention provides a directional hydrophone system capable of measuring the bearing of a sound with relation to magnetic north. It will also be clear that the present invention provides a method of reducing the size of the Hall compass forming a part of the directional hydrophone system or of any Hall compass. It will also be clear from the above description that the above invention provides an improved transducer for use in an underwater sonar system or the like, said transducer being highly sensitive and accurate no matter what the angle of approach of the sound.

It should be understood that the resolving system of the present invention finds application other than in a sonar arrangement. For example, the arrangement might be incorporated in a traffic light control for sensing the location or direction of automobiles approaching a crossing and for operating the traffic light according to the number and location of the automobiles. Obviously a different type of transducer as well as other components would be used but the principle of the resolving system would be the same. The resolving system could also find application in computers and in stereo microphone or hydrophone broadcasting. Still another application of the principle of the present invention might be the use of a Hall compass to measure the direction of a current flow far underneath the surface of the water. In other words, the Hall compass of the present invention might be fixed to a mechanical device for measuring current flow in order that the orientation of the mechanical device and thus the direction of the current flow could be determined by an oceanographer.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A transducer comprising a cylinder composed of electromechanically sensitive dielectric material, said cylinder being divided into four quadrants and having a plurality of equally spaced bores in each of the four quadrants and extending longitudinally of the cylinder, conductive coatings on the interior and exterior of the cylinder, conductive coatings on the cylinder inside of said bores, means for electrically connecting in series all of the bores in each quadrant with the most endward bores of each quadrant at the end of each series, means for electrically connecting one of the most endward bores to the bore diametrically opposed thereto, and means for electrically connecting the most endward bore adjacent to said one bore to the bore diametrically opposed thereto.

2. A transducer comprising a cylinder composed of electromechanically sensitive material, said cylinder being divided into four quadrants and having a plurality of equally spaced bores in each of the four quadrants and extending longitudinally of the cylinder, conductive coatings on the interior and exterior of the cylinder, and conductive coatings on the cylinder inside of said bores.

3. A transducer comprising a cylinder composed of electromechanically sensitive material, said cylinder having a plurality of equally spaced bores midway between its inner and outer walls and extending longitudinally of the cylinder.

No references cited.

CHESTER L. JUSTUS, *Primary Examiner.*

J. P. MORRIS, *Assistant Examiner.*